US011910510B2

(12) United States Patent
Rojo-Calderon et al.

(10) Patent No.: US 11,910,510 B2
(45) Date of Patent: Feb. 20, 2024

(54) AEROSOL-GENERATING ARTICLE, AEROSOL-GENERATING PELLET, METHOD FOR FORMING AEROSOL-GENERATING PELLETS AND AEROSOL-GENERATING SYSTEM COMPRISING AEROSOL-GENERATING PELLETS

(71) Applicant: PHILIP MORRIS PRODUCTS S.A., Neuchatel (CH)

(72) Inventors: Noelia Rojo-Calderon, Neuchatel (CH); Rui Nuno Batista, Morges (CH)

(73) Assignee: PHILIP MORRIS PRODUCTS S.A., Neuchatel (CH)

( * ) Notice: Subject to any disclaimer, the term of this patent is extended or adjusted under 35 U.S.C. 154(b) by 284 days.

(21) Appl. No.: 15/769,140

(22) PCT Filed: Oct. 21, 2016

(86) PCT No.: PCT/EP2016/075309
§ 371 (c)(1),
(2) Date: Apr. 18, 2018

(87) PCT Pub. No.: WO2017/068093
PCT Pub. Date: Apr. 27, 2017

(65) Prior Publication Data

US 2018/0295885 A1 Oct. 18, 2018

(30) Foreign Application Priority Data

Oct. 22, 2015 (EP) .................................... 15190935

(51) Int. Cl.
*A24F 40/20* (2020.01)
*H05B 6/10* (2006.01)
(Continued)

(52) U.S. Cl.
CPC ............... *H05B 6/106* (2013.01); *A24C 5/01* (2020.01); *A24D 1/20* (2020.01); *A24F 40/465* (2020.01); *A24F 40/20* (2020.01)

(58) Field of Classification Search
CPC .... A24F 47/008; A24F 47/004; A24F 47/006; A24F 40/00; A24F 40/20; A24F 40/30;
(Continued)

(56) References Cited

U.S. PATENT DOCUMENTS 3,409,020 A * 11/1968 Westbrook, Jr. ....... A24D 3/163 131/342
4,858,630 A 8/1989 Banerjee
(Continued)

FOREIGN PATENT DOCUMENTS

CN 103929989 A 7/2014
CN 204132402 U 2/2015
(Continued)

OTHER PUBLICATIONS

PCT Search Report and Written Opinion for PCT/EP2016/075309 dated Jan. 24, 2017 (12 pages).
(Continued)

*Primary Examiner* — Philip Y Louie
*Assistant Examiner* — Yana B Krinker
(74) *Attorney, Agent, or Firm* — Oblon, McClelland, Maier & Neustadt, L.L.P.

(57) ABSTRACT

The aerosol-generating article (9) comprises a casing (8) and a plurality of aerosol-generating particles (1) arranged in the casing. The aerosol-generating particles of the plurality of aerosol-generating particles comprise a core of susceptor material, which core of susceptor material is coated with aerosol-forming substrate. Also disclosed is an aerosol-forming pellet (3) and a method for forming aerosol-generating pellets. The method comprises the steps of providing
(Continued)

a plurality of particles, filling the plurality of particles into a cavity of a predefined shape and compacting the plurality of particles in the cavity, thereby forming an aerosol-generating pellet having the shape of the cavity.

22 Claims, 4 Drawing Sheets

(51) Int. Cl.
*A24F 40/465* (2020.01)
*A24C 5/01* (2020.01)
*A24D 1/20* (2020.01)

(58) Field of Classification Search
CPC ......... A24F 40/40; H05B 6/106; A24B 15/18; A24B 15/186; A24B 15/283–287; A61M 15/06; A24D 1/20; A24C 5/01
See application file for complete search history.

(56) References Cited

U.S. PATENT DOCUMENTS

| | | | | |
|---|---|---|---|---|
| 4,981,522 | A | 1/1991 | Nichols et al. | |
| 5,105,831 | A * | 4/1992 | Banerjee | A24F 47/004 131/194 |
| 5,613,505 | A | 3/1997 | Campbell | |
| 2002/0117175 | A1 | 8/2002 | Kottayil et al. | |
| 2013/0186416 | A1 | 7/2013 | Gao et al. | |
| 2013/0327327 | A1 * | 12/2013 | Edwards | A61M 15/0016 128/203.11 |
| 2015/0245669 | A1 | 9/2015 | Cadieux | |

FOREIGN PATENT DOCUMENTS

| | | | | |
|---|---|---|---|---|
| EP | 1 909 604 | | 2/2007 | |
| JP | S56-66345 | U1 | 6/1981 | |
| JP | H2-84164 | A | 3/1990 | |
| JP | H8-511175 | A | 11/1996 | |
| JP | 2014-533515 | A | 12/2014 | |
| WO | 95/27411 | A1 | 10/1995 | |
| WO | WO 95/27411 | | 10/1995 | |
| WO | 2013/076254 | A2 | 5/2013 | |
| WO | WO-2015177046 | A1 * | 11/2015 | A24F 40/42 |
| WO | WO-2015179388 | A1 * | 11/2015 | A24F 40/42 |

OTHER PUBLICATIONS

Notification of Second Office Action dated Feb. 19, 2021 in corresponding Chinese Patent Application No. 201680059955.1 (with English translation)(10 pages).
Notification of Reason(s) for Refusal dated Nov. 30, 2020 in corresponding Japanese Patent Application No. 2018-517409 (with English translation)(4 pages).

* cited by examiner

AEROSOL-GENERATING ARTICLE, AEROSOL-GENERATING PELLET, METHOD FOR FORMING AEROSOL-GENERATING PELLETS AND AEROSOL-GENERATING SYSTEM COMPRISING AEROSOL-GENERATING PELLETS

This application is a U.S. National Stage Application of International Application No. PCT/EP2016/075309, filed Oct. 21, 2016, which was published in English on Apr. 27, 2017, as International Publication No. WO 2017/068093 A1. International Application No. PCT/EP2016/075309 claims priority to European Application No. 15190935.5 filed Oct. 22, 2015.

BACKGROUND

The invention relates to aerosol-generating articles and aerosol-generating pellets comprising a plurality of particles. The invention also relates to a method for manufacturing such aerosol-generating pellets and to an aerosol-generating system comprising such aerosol-generating pellets or aerosol-generating articles.

In aerosol-generating heating systems known from the prior art a tobacco containing material of a consumable is heated by a heating element for aerosol formation. Often, a contact between the heating element and the tobacco containing material is not satisfactory. Thus, heating may be insufficient, in particular a heat transfer and distribution over an entire amount of tobacco material. This in turn may cause waste of unused tobacco material.

Therefore, it would be desirable to have an aerosol-forming substrate having good heat contact to a heating element. In particular, it would be desirable to have an inductively heatable aerosol-forming substrate providing flexibility relating to its application in aerosol-generating devices.

BRIEF SUMMARY

According to an aspect of the present invention, there is provided an aerosol-generating article. The aerosol-generating article comprises a casing and a plurality of aerosol-generating particles arranged inside the casing. The aerosol-generating particles of the plurality of aerosol-generating particles comprise a core of susceptor material, which core of susceptor material is coated with aerosol-forming substrate.

The coating of a core of susceptor material with aerosol-forming substrate provides a very close and direct physical contact between the substrate and the susceptor material. Thus, heat transfer from the susceptor to the substrate is optimized. The close contact may lead to a very homogeneous temperature profile across the aerosol-forming substrate in the coating. Thus, a total amount of substrate may be reduced due to an efficient use of the substrate. As a consequence, waste of material or costs may be reduced. Yet further, overheating of the aerosol-forming substrate may be prevented and thus combustion of the substrate and combustion products formed may be reduced or prevented. The amount of heating energy may be reduced, which may in particular be advantageous in view of longer operation time of a device or in view of battery capacity or battery size of an electronic heating device. Improved heat transfer and large contact areas may also lead to a faster heating-up of the aerosol-forming substrate and thus to shorter start-up times and less energy required for a device to get ready for use.

By providing a plurality of particles, the entirety of the aerosol-generating particles may be adapted to any form of casing. In addition, the plurality of particles may be chosen to completely or only partly fill a casing. Thus, a dosing regime may be chosen and varied according to a user's needs, for example, to achieve a specific consuming experience. The specific consuming experience may be varied by varying the amount or the composition of the plurality of particles. A dosing regime may, for example, be chosen to generate an equivalent of a predefined number of puffs, for example for one or more inhaling experiences. Thus, consumption may be optimized and waste may be avoided or reduced. Yet further, a composition of the plurality of particles may basically be chosen and varied at will. For example, the plurality of particles comprised in an aerosol-generating article may all be identical particles, that is, particles having, for example, identical compositions, shapes, sizes or aerosol delivery profiles. However, a plurality of particles comprised in an aerosol-generating article may comprise different types of particles as will be described in more detail below. This variability and flexibility of an inductively heatable aerosol-forming article allows customization of a consuming experience, which is not possible with other kind of aerosol-generating articles essentially having a "one-piece" consumable.

Due to the presence of a plurality of particles, the aerosol-generating article comprising the plurality of particles is very homogeneous. Thus, it is possible to improve consistency in aerosol formation between puffs during a consuming experience as well as repeatability between consuming experiences. In addition, also when heating different individual portions of the aerosol-generating article (segmented heating), that is, portions of the plurality of particles, a homogenous or consistent aerosol generation may be provided.

Aerosol-generating devices for use with the aerosol-generating article according to the invention may be adapted to inductive heating, for example, may be provided with electronics and a load network including an inductor. Thus, such devices may be manufactured, requiring less power than conventionally heated devices, for example comprising heating blades, and may provide all advantages of contactless heating (for example, no broken heating blades, no residues on heating element, electronics separated from heating element and aerosol-forming substances, facilitated cleaning of the device). In particular, performance of a device used in combination with the aerosol-generating article according to the invention may be enhanced due to 'fresh' heating elements provided with each new aerosol-generating article. No residues may accumulate on heating elements possibly negatively influencing quality and consistency of a consuming experience.

The plurality of particles may be a loose agglomerate of particles arranged in the casing. In these embodiments, preferably, the casing is an entirely, that is hermitically closed casing, which is opened only, for example, by piercing or perforating the casing such as to allow an air-flow to pass through the casing and for the aerosol generated in the casing to leave the casing. Such a hermetically closed casing may, for example have the form of a capsule, for example such as gel capsules known from medical applications.

Advantageously, the plurality of particles is softly compacted or pelletized. The plurality of particles may form one or more aerosol-generating pellets. Preferably, the plurality of particles forms one pellet.

A softly compacted plurality of particles forms an entity providing a localization of the plurality of particles. A pelletized plurality of particles provides a mechanical stability that allows good handling without fragmentation of the pellet formed by the plurality of particles.

For the sake of simplicity the term 'pellet' is used for softly compacted as well as for pelletized pluralities of particles.

A pellet may directly be used as consumable in an inductive heating device, that is, the pellet my directly be inserted into a device cavity of the device. The pellet may also be used to fill a predefined volume inside a casing of an aerosol-generating article. A pellet may, for example, replace a tobacco plug in a tobacco stick used in electronic heating devices. In such embodiments, the casing is a tipping paper or wrapping material assembling the pellet with other segments used in the tobacco stick.

A pellet may be formed inside a casing or may be preformed and inserted into a casing after forming the pellet. A preformed pellet allows to arrange more than one pellet in a casing, depending on the application of the aerosol-generating article.

Preferably, a casing has a longitudinal shape having a longitudinal axis. If more than one aerosol-generating pellet is arranged in a casing, preferably the individual pellets are arranged at a distance to each other along the longitudinal axis of the casing. This allows for a segmented heating if used in a device allowing segmented heating. For example, the device may have an inductor in the form of several induction coils, wherein each induction coil is provided for heating one of the pellets. Preferably, the more than one pellet is linearly arranged with a cylinder axis of individual cylindrical or substantially cylindrical pellets being coincident. Such more than one (individual) linearly arranged cylindrical pellet may or may not have a rod-shape.

As mentioned above, the casing may be perforated or punctured before use. Preferably, the casing comprises two opposed ends and one or both of the opposed ends of the casing is frangible.

In embodiments of the aerosol-generating article, where pellets are used, the casing may have open ends. The open ends are preferably sealed for storing the aerosol-generating article. Preferably, the casing is cylindrical and one or both of the opposed ends is sealed by one or more frangible or removable barriers. Preferably, one or both of the opposed ends are planar. The removable barriers, such as for example peelable seals, are removed before use of the aerosol-generating article.

The terms 'cylindrical' and 'planar' are herein used to include also 'substantially cylindrical' and 'substantially planar'. 'Cylindrical' is to be understood to include forms which have the shape of a cylinder or a tapered cylinder of circular or substantially circular cross-section, or which have the shape of a cylinder or a tapered cylinder of elliptical or substantially elliptical cross-section. While various combinations and arrangements of these slightly different shapes of casings are possible, in a preferred embodiment the casing has the shape of a cylinder having a circular cross-section.

'Planar' is to be understood to include exactly plane but also structured or slightly concave or convex shapes.

The one or more frangible barriers may be formed from any suitable material. For example, the one or more frangible barriers may be formed from a metal foil or film.

Preferably, the frangible barrier is formed of a material comprising no, or a limited amount of ferromagnetic material or paramagnetic material. In particular, the frangible barrier may comprise less than 20%, in particular less than 10% or less than 5% or less than 2% of ferromagnetic or paramagnetic material.

An aerosol-generating device the aerosol-generating article is used with may comprise a piercing member configured to rupture the casing or the one or more frangible barriers sealing the casing. Alternatively or in addition, one or both ends of the casing may be sealed by one or more removable barriers. For example, one or both of the ends may be sealed by one or more peel-off seals.

The casing may have any suitable size. The casing may have a length in a range, for example, between 5 mm and 30 mm. Preferably, a length may be in a range between 7 mm and 18 mm. The casing may have an outer diameter in a range between, for example, 2.2 mm and 15 mm. Preferably, an outer diameter is in a range between 4 mm and 8 mm. The casing may have an inner diameter in a range between, for example, between 2 mm and 12 mm. Preferably, an inner diameter is in a range between 3 mm and 7 mm.

Advantageously, outer dimensions of the casing correspond to dimensions of the aerosol-generating article.

As a general rule, whenever a value is mentioned throughout this application, this is to be understood such that the value is explicitly disclosed. However, a value is also to be understood as not having to be exactly the particular value due to technical considerations. A value may, for example, include a range of values corresponding to the exact value plus or minus 20 percent.

Preferably, the casing comprises a polymer material or a cellulose based material.

Preferably, the casing is a capsule or a tubular element.

Casings may be made of polymers compatible with nicotine, including medical grade polymers, such as: ALTUGLAS® Medical Resins Polymethlymethacrylate (PMMA), Chevron Phillips K-Resin® Styrene-butadiene copolymer (SBC), Arkema special performance polymers Pebax®, Rilsan®, and Rilsan® Clear, DOW (Health+™) Low-Density Polyethylene (LDPE), DOW™ LDPE 91003, DOW™ LDPE 91020 (MFI 2.0; density 923), ExxonMobil™ Polypropylene (PP) PP1013H1, PP1014H1 and PP9074MED, Trinseo CALIBRE™ Polycarbonate (PC) 2060-SERIES.

Casings may also be made of paper or other cellulose type of materials, such as cellulose acetate.

Casing material may also be selected from the group consisting of polyethylene (PE), polypropylene (PP), polyvinylchloride (PVC), polyethylene terephthalate (PET), polylactic acid (PLA), and cellulose acetate (CA).

Casings, in particular pierceable or punctuable capsules may, for example, be made of aqueous solutions of gelatine and hypromellose based formulations, namely comprising plant polysaccharides including their derivatives such as carrageenan based materials, and gelling agents solutions such as glycerine as plasticizer. Gelling agents may include starch or cellulose, or modified forms thereof. Preferably, materials for capsules are cellulose based, preferably composed of hydroxypropyl methylcellulose (HPMC), preferably, in a form with low viscoelastic properties enabling to achieve a desired burst strength allowing puncturing or perforation of the capsule. Material for a capsule may, for example comprise: Vegesoft®, Pullulan and hypromellose, glycerin, sorbitol (incl. Sorbitol Special®) and polyethylene (PEG) based fills.

The material of a casing should be chemically resistant for the materials used in the particles or pellets formed by the particles, in particular should be resistant to materials of the aerosol forming substrate coating. Additionally, or alternatively, the particles or the pellets may comprise an external protection layer. Such an external protection layer may prevent chemical interaction with the environment, in particular chemical reaction with the casing or provide a moisture protection as will be described in further detail below.

According to another aspect of the invention, there is provided an aerosol-generating pellet, preferably, for use in an aerosol-generating article as described herein. The aerosol-generating pellet is a compacted plurality of aerosol-generating particles, the particles of the plurality of aerosol-generating particles each comprises a core of susceptor material coated with aerosol-forming substrate.

Advantages of the close contact between susceptor material and aerosol-forming substrate and its effect on heating efficiency have been described above and will not be repeated. In addition, a pellet provides a mechanically stable product to be directly used as consumable in an inductive heating device or to be used in a casing of an aerosol-generating article such as, for example, a capsule or tubular element. A pellet may also comprise a defined porosity to cope with a specific air-flow management through the pellet or a specific resistance-to-draw (RTD) of the pellet or of an aerosol-generating system using a pellet as aerosol-generating product. Porosity may, for example, be defined by a force compacting the particles used for forming the pellet or through selection of shape of the particles.

A pellet may have a porosity in a range between about 0.2 and about 0.35, the porosity being the volume fraction of void space within the pellet. In a preferred embodiment, the porosity is between about 0.24 and about 0.35.

The resistance to draw (RTD) of a pellet, when it is placed in an aerosol generating device is between 40 and 120 mm $H_2O$, preferably between 80 and 120 mm $H_2O$. The pellet preferably has a porosity, which causes the RTD of the pellet, when placed in an aerosol generating device, to be within the above mentioned ranges.

By choosing the size of a pellet or additionally the number of pellets used in an aerosol-generating article or directly in an aerosol-generating device, an amount of aerosol-forming substrate for aerozolization may be dosed to a desired amount in order to cope with a number of puffs corresponding to one, two or more consuming experiences.

Preferably, an aerosol-generating pellet has a cylindrical shape. A pellet may have a length between 2 millimeter and 20 millimeter, preferably between 3 millimeter and 10 millimeter. The pellet may have a diameter between 2 millimeter and 12 millimeter, preferably between 3 millimeter and 7 millimeter.

An aerosol-generating pellet may comprise a compacted plurality of identical particles or a compacted plurality of different types of aerosol-generating particles. Different types of aerosol-generating particles differ in at least one of size or shape of the particles, for example rough or smooth surface, spherical or angular; shape or composition of susceptor material, for example granules or flakes having a same or different surface structure or material composition; thickness of the aerosol-forming substrate coating; porosity or composition of the aerosol-forming substrate coating; or may differ in aerosol delivery profiles.

Particles may be granules, flakes or other particulate material, for example having round, flat or longitudinally extended shapes, having regular or irregular shapes or surfaces. Granules may for example be beads or grit. A particle may comprise a single or multiple coating of aerosol-forming substrate. A particle may comprise a core comprising a single susceptor particle or several susceptor particles.

A granule is herein defined as being an element having a shape, wherein any dimension is smaller than twice of any other dimension. The shape may be round, substantially round or angular. A surface of the granule may be angular, rough or smooth.

A flake is herein defined as being an element having a shape having one predominant dimension, which predominant dimension is at least twice as large as any other dimension. Preferably, a flake has at least one surface that is substantially flat.

Other particulate material may basically have any volumetric shape within a given granulometry range. Such other particulate material preferably comprises a core of susceptor material formed of susceptor fibers coated with aerosol-forming substrate.

Advantageously, particles for use in an aerosol-generating article according to the invention or for forming a pellet according to the invention, respectively, has a maximum size of 6 mm, preferably 4 mm, more preferably 2 mm.

Preferably, a particle, or a largest dimension of a particle if not of substantially round shape, is not smaller than 0.2 mm, preferably not smaller than 0.5 mm. Particle sizes in this range allow the manufacture of particles having an optimized ratio of susceptor material to aerosol-forming substrate. A ratio of an amount of susceptor material to an amount of aerosol-forming substrate may be varied. However, preferably such a ratio is fixed within a certain range.

A ratio of an amount of susceptor material to an amount of aerosol-forming substrate may be 1:1 to 1:4, preferably 1:1.5 to 1:2.5. The ratios are considered volumetric ratios.

Ratios in this range are favorable with respect to efficient and preferably homogenous heating of the aerosol-forming substrate and aerosol-production. The ratio may be configured such that heating is performed in a manner to provide a consistent substance delivery, preferably nicotine delivery to a user.

The core of susceptor material of the particles of the plurality of particles may be a susceptor particle such as a susceptor granule, susceptor flake or susceptor fibers. The susceptor particle may, for example have a round, flat or longitudinally extended shape, have a regular or irregular shape or surface. A susceptor granule may for example be a susceptor bead or susceptor grit.

In general, a susceptor is a material that is capable of absorbing electromagnetic energy and converting it to heat. When located in an alternating electromagnetic field, typically eddy currents are induced and hysteresis losses occur in the susceptor causing heating of the susceptor. In the particles changing electromagnetic fields generated by one or several inductors, for example, induction coils of an inductive heating device heat the susceptor core, which then transfers the heat to the surrounding coating of aerosol-forming substrate, mainly by conduction of heat such that an aerosol is formed. Such a transfer of heat is best, if the susceptor is in close thermal contact with tobacco material and aerosol former of the aerosol-forming substrate coating. Due to the coating process, a close interface between core of susceptor material and aerosol-forming substrate coating is formed.

The susceptor may be formed from any material that can be inductively heated to a temperature sufficient to generate an aerosol from the aerosol-forming substrate and that allow the manufacture of susceptor particles such as granules, flakes and fibers. Preferred susceptors comprise a metal or carbon. A preferred susceptor may comprise or consist of a ferromagnetic material, for example ferritic iron, a ferromagnetic alloy, such as a ferromagnetic steel or stainless steel, ferromagnetic particles, and ferrite. A suitable susceptor may be, or comprise, aluminium. Preferred susceptors may be heated to a temperature in excess of 250 degrees Celsius.

Preferred susceptors are metal susceptors, for example stainless steel. However, susceptor materials may also comprise or be made of graphite, molybdenum, silicon carbide, aluminum, niobium, Inconel alloys (austenite nickel-chromium-based superalloys), metallized films, ceramics such as for example zirconia, transition metals such as for example Fe, Co, Ni, or metalloids components such as for example B, C, Si, P, Al.

Preferably, the core of susceptor material is a metallic susceptor particle.

The susceptor may also be a multi-material susceptor and may comprise a first susceptor material and a second susceptor material. The first susceptor material may be disposed in intimate physical contact with the second susceptor material. The second susceptor material preferably has a Curie temperature that is below the ignition point of the aerosol-forming substrate. The first susceptor material is preferably used primarily to heat the susceptor when the susceptor is placed in a fluctuating electromagnetic field. Any suitable material may be used. For example the first susceptor material may be aluminium, or may be a ferrous material such as a stainless steel. The second susceptor material is preferably used primarily to indicate when the susceptor has reached a specific temperature, that temperature being the Curie temperature of the second susceptor material. The Curie temperature of the second susceptor material can be used to regulate the temperature of the entire susceptor during operation. Suitable materials for the second susceptor material may include nickel and certain nickel alloys.

By providing a susceptor having at least a first and a second susceptor material, the heating of the aerosol-forming substrate and the temperature control of the heating may be separated. Preferably the second susceptor material is a magnetic material having a second Curie temperature that is substantially the same as a desired maximum heating temperature. That is, it is preferable that the second Curie temperature is approximately the same as the temperature that the susceptor should be heated to in order to generate an aerosol from the aerosol-forming substrate.

Susceptor granules such as beads and grits may be manufactured from melting a raw material, for example an alloy, to create metal droplets. For manufacturing the beads, which are substantially round but may have a spherical or irregular spherical (angular) shape, the droplets may be reshaped and sieved to obtain a specific granulometry range.

For manufacturing grits, which are substantially round but have angular shapes, the droplets may be crushed into angular particles and sieved to obtain a specific granulometry range. Grits may also be obtained from industrial residues of stainless steel processing factories, for example, residues caused by manufacturing medical tools or processing medical grade alloys. These residues may be trimmed and crushed and sieved to obtain a specific granulometry range.

Susceptor flakes may be manufactured, for example, by milling techniques using various raw material including recycling material as mentioned above. For manufacturing susceptor flakes, which have a substantially flat shape with a spherical or irregular spherical (angular) circumferential shape, the raw materials are processed, for example in several processing steps, to obtain flakes in a defined thickness and overall size range. Preferably, in a processing step, it is ascertained that the flakes do not agglomerate and that no fragmentation of the flakes into smaller particles occurs.

Susceptor fibers may be manufactured by sintering susceptor material. The fibers may form woven or non-woven susceptor particles.

A size of a susceptor granule, for example a bead or grit, may be between 0.2 mm and 2.4 mm, preferably between 0.2 mm and 1.7 mm, more preferably between 0.3 mm and 1.2 mm.

A maximal length of a susceptor flake may be between 0.2 mm and 4.5 mm, preferably between 0.4 mm and 3 mm, more preferably between 0.5 mm and 2 mm.

A thickness of susceptor flakes may be between 0.02 mm and 1.8 mm, preferably between 0.05 mm and 0.7 mm, more preferably between 0.05 mm and 0.3 mm.

A thickness of fibers may be between 30 micrometer and 1.5 mm.

Advantageously, a core of susceptor material consists of one particle. However, a core of susceptor material may comprise several particles, for example two particles. If several particles form a susceptor core, then the sum of the sizes of the several particles is within the given granulometry range mentioned herein.

A susceptor particle may be partially or entirely porous. A susceptor particle may be massive or hollow.

Advantageously, for susceptor particles susceptor materials are used having melting temperatures between 1450 degree Celsius and 1500 degree Celsius. Particle densities may be between 5 g/cm3 and 9 g/cm3, preferably between 6 g/cm3 and 8 g/cm3. A bulk density, which is dependent on a particle size, may be between 2.8 g/cm3 and 6.6 g/cm3, preferably between 3.5 g/cm3 and 4.7 g/cm3 for beads and flakes. A bulk density of grit may be in a slightly more narrow density range between 3.1 g/cm3 and 6.2 g/cm3, preferably between 3.8 g/cm3 and 4.1 g/cm3. A hardness of susceptor beads and flakes may be between 30 HRC to 70 HRC (Rockwell scale), preferably between 30 HRC and 50 HRC, wherein a hardness of susceptor grits, preferably is between 30 HRC and 70 HRC, more preferably between 40 HRC and 60 HRC.

Aerosol-forming substrate may be a tobacco containing aerosol-forming substrate. The aerosol-forming substrate may be provided in the form of a slurry. Depending on a coating method for applying a substrate coating onto a susceptor core a moisture content of the slurry may vary.

Preferably, the tobacco containing slurry and the aerosol-forming substrate coating made from the tobacco containing slurry comprises tobacco particles, fiber particles, aerosol former, binder and for example also flavours. Preferably, a coating is a form of reconstituted tobacco that is formed from the tobacco containing slurry.

Tobacco particles may be of the form of a tobacco dust having particles in the order of 30 micrometers to 250 micrometers, preferably in the order of 30 micrometers to 80 micrometers or 100 micrometers to 250 micrometers, depending on the desired coating thickness.

Fiber particles may include tobacco stem materials, stalks or other tobacco plant material, and other cellulose-based fibers such as wood fibers having a low lignin content. Fiber particles may be selected based on the desire to produce a sufficient tensile strength for the coating versus a low inclusion rate, for example, an inclusion rate between approximately 2 percent to 15 percent. Alternatively, fibers, such as vegetable fibers, may be used either with the above fiber particles or in the alternative, including hemp and bamboo.

Aerosol formers included in the slurry for forming the coating may be chosen based on one or more characteristics. Functionally, the aerosol former provides a mechanism that allows it to be volatilized and convey nicotine or flavouring or both in an aerosol when heated above the specific volatilization temperature of the aerosol former. Different aerosol formers typically vaporize at different temperatures. An aerosol former may be chosen based on its ability, for example, to remain stable at or around room temperature but able to volatize at a higher temperature, for example, between 40 degree Celsius and 450 degree Celsius. The aerosol former may also have humectant type properties that help maintain a desirable level of moisture in an aerosol-forming substrate when the substrate is composed of a tobacco-based product including tobacco particles. In particular, some aerosol formers are hygroscopic material that function as a humectant, that is, a material that helps keep a substrate containing the humectant moist.

One or more aerosol former may be combined to take advantage of one or more properties of the combined aerosol formers. For example, triacetin may be combined with glycerin and water to take advantage of the triacetin's ability to convey active components and the humectant properties of the glycerin.

Aerosol formers may be selected from the polyols, glycol ethers, polyol ester, esters, and fatty acids and may comprise one or more of the following compounds: glycerin, erythritol, 1,3-butylene glycol, tetraethylene glycol, triethylene glycol, triethyl citrate, propylene carbonate, ethyl laurate, triacetin, meso-Erythritol, a diacetin mixture, a diethyl suberate, triethyl citrate, benzyl benzoate, benzyl phenyl acetate, ethyl vanillate, tributyrin, lauryl acetate, lauric acid, myristic acid, and propylene glycol.

A typical process to produce a slurry for a tobacco containing aerosol-forming substrate includes the step of preparing the tobacco. For this, tobacco is shredded. The shredded tobacco is then blended with other kinds of tobacco and grinded. Typically, other kinds of tobacco are other types of tobacco such as Virginia or Burley, or may for example also be differently treated tobacco. The blending and grinding steps may be switched. The fibers are prepared separately and preferably such as to be used for the slurry in the form of a solution. Since fibers are mainly present in the slurry for providing stability to a coating, the amount of fibers may be reduced or fibers may even be omitted due to the aerosol-forming substrate coating being stabilized by the core of susceptor material.

If present, the fiber solution and the prepared tobacco are then mixed. The slurry is then transferred to a coating or granulation device. After single or multiple-coating with the same or different slurries, the particles are then dried, preferably by heat and cooled after drying.

Preferably, the tobacco containing slurry comprises homogenized tobacco material and comprises glycerin as aerosol former. Preferably, the coating of aerosol-forming substrate is made of a tobacco containing slurry as described above.

Advantageously, aerosol-forming substrate surrounding the core of susceptor material is porous to allow volatilized substances to leave the substrate. Due to the aerosol-forming substrate forming a coating of the susceptor material, only a small amount of substrate must be heated by one susceptor core, compared to aerosol-forming substrates heated by, for example, a heating blade. Thus, also coatings having no or only little porosity may be used. A coating with small thickness may, for example, be chosen to have less porosity than a coating with large thickness.

A coating of the susceptor material may be a single coating or a multiple coating.

Advantageously, a thickness of an aerosol-forming substrate coating is between 0.05 mm and 4.8 mm, preferably, between 0.1 mm and 2.5 mm.

If a second aerosol-forming substrate coating is applied, advantageously, a thickness of the second coating is between 0.05 mm and 4 mm, preferably between 0.1 mm and 1.3 mm.

Multiple-coatings may be identical, for example in composition and density. Preferably, individual coatings of multiple-coatings differ in at least one of composition, porosity, coating thickness or shape of coating surface.

By choosing more than one but differing aerosol-forming substrates, aerosolization may be varied and controlled for a given inductive heating device. Also the delivery of different substances, such as, for example, nicotine or flavours may be varied and controlled for a given inductive heating device. In particular, an aerosol-generating system with customized performance may be provided.

The particles may be provided with further coatings comprising further aerosol-forming substrates. Advantageously, the further coatings are different from a first or second coating. Preferably, a thickness of further coatings is smaller than a thickness of the first or second coating or a previous further coating.

Different coating specifics may be achieved by providing coating materials having different material compositions or different amounts of the same materials. Different coating specifics may also be achieved by different coating techniques. Different coating techniques are preferably chosen for achieving different coating surfaces or substrate densities of a coating. For example, coating techniques having a rotative chamber generally provide smother coating surfaces, while wet granulation equipment may be preferred for obtaining rough coating surfaces.

The particles, or a pellet formed from a plurality of particles may further comprise at least one protection layer. A protection layer may, for example, assure or enhance a shelf life of a particle or of the pellet, respectively. Additionally or alternatively a protection layer may optimize use and vaporization behaviour of a particle or of a pellet.

A protection layer may be an outer protection layer protecting the particle and its coating materials against environmental influences. Preferably, an outer layer is a moisture protection layer. Preferably, an outer protection layer is an outermost material of the particle.

A protection layer may also be an inner protection layer, for example, arranged between two coatings. An inner protection layer may be favourable, if a contact between two coatings shall be allowed only upon consumption of the product.

A protection layer may also be used for marking purposes, for example, by adding a colour to an outer protection layer.

Particles may basically be coated with one or several coatings by any kind of wet granulation or dry granulation or wet coating or dry coating. Wet or dry coating may be, for example, powder or slurry coating or rotary coating. Wet granulation may, for example, be batch or continuous fluid-bed granulation, bottom or top-spray granulation. Dry granulation may, for example include shear granulation, spheronization or rotor granulation. Dry granulation is preferably used for the manufacture of particles in the form of granules.

Preferably, the particles used in the aerosol-generating article or the aerosol-generating pellet according to the invention are coated with one or two coatings according to any one of the above coating methods.

These coating methods are standard reliable industrial processes that allow for mass production of coated particles. These coating processes also enable high product consistency in production and repeatability in performance of the particles.

According to another aspect of the invention, there is provided a method for forming aerosol-generating pellets. The method comprises the steps of providing a plurality of particles, filling the plurality of particles into a cavity of a predefined shape and compacting the plurality of particles in the cavity. Thereby an aerosol-generating pellet having the shape of the cavity is formed. The particles used for forming the pellets comprise a core of susceptor material coated with aerosol-forming substrate.

The cavity may be a cavity of a pellet forming mold, for example of a pellet molding apparatus. The plurality of particles is filled into the mold, compacted in the mold and may then be removed from the mold as pellet.

The cavity may also be a cavity of a casing of an aerosol-generating article. Thus, the step of filling the plurality of particles into a cavity may comprise filling the plurality of particles into a separate casing, and forming the aerosol-generating pellet inside the casing. Thereby, an aerosol-generating article including casing and aerosol-generating pellet is manufactured. In further steps, the casing including the aerosol-generating pellet may be removed from a pelletizing apparatus. Open ends of the casing may subsequently be sealed, preferably by frangible or removable barriers.

According to yet another aspect of the invention there is provided an aerosol-generating system. The aerosol-generating system comprises at least one aerosol-generating pellet according to the invention and as described herein or an aerosol-generating article according to the invention and as also described herein. The system further comprises an aerosol-generating device comprising a device housing comprising a device cavity arranged in the device housing. The device cavity contains the at least one aerosol-generating pellet or the aerosol-generating article, respectively. A power source of the system is connected to a load network, wherein the load network comprises an inductor for being inductively coupled to a core of susceptor material of a plurality of particles of the at least one aerosol-generating pellet, possibly of the aerosol-generating article comprising the plurality of particles, preferably in the form of one or more pellets. The inductor may for example be one or more induction coils. If one induction coil only is provided, the single induction coil is inductively coupled to the plurality of particles, for example, of the pellet or the pellets. If several induction coils are provided, each induction coil may heat one pellet or individual portions of the pellet formed by the plurality of particles.

The aerosol-generating device of the system according to the invention may comprise a piercing member for piercing a casing comprising the at least one aerosol-generating pellet.

Advantages and further aspects of the method as well as of the system according to the invention have been discussed relating to the aerosol-generating article according to the invention and the aerosol-generating pellet according to the invention and will not be repeated.

BRIEF DESCRIPTION OF THE DRAWINGS

The invention is further described with regard to embodiments, which are illustrated by means of the following drawings, wherein.

DETAILED DESCRIPTION

Figure 1:
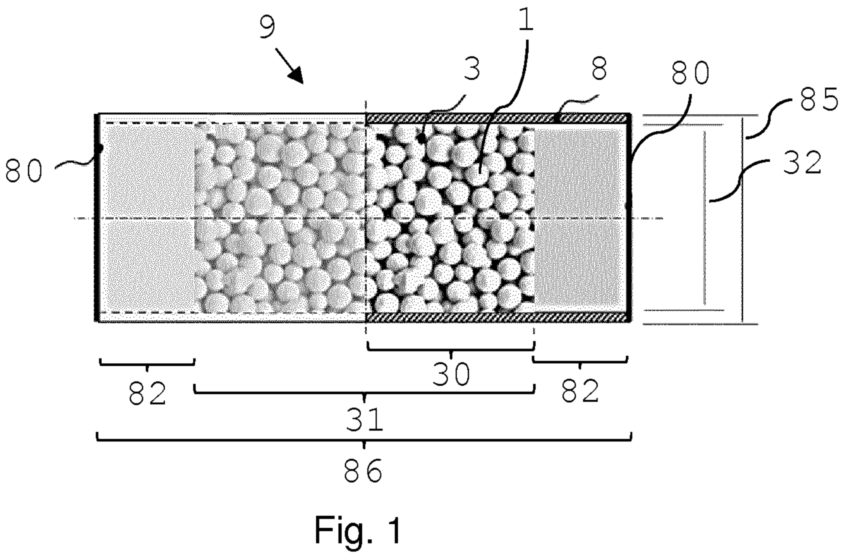
FIGS. 1,2 are schematic illustrations of a tubular-shaped consumable comprising a pellet in a partial longitudinal and a transversal cross sectional view.
Figure 2:
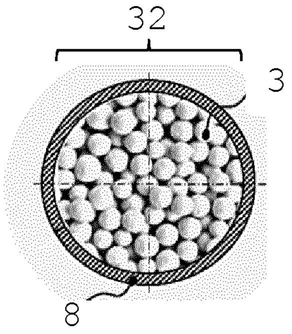

FIG. 1 and FIG. 2 show a tubular shaped casing 8, for example made of a polymeric material or cardboard, having a circular diameter 85. A pellet 3 formed of a compacted plurality of particles 1 comprising susceptor material and aerosol-forming substrate is arranged in the casing 8. The pellet is a double-length pellet, assembled by arranging two single-length pellets 3 adjoining each other in the casing 8. The embodiment of FIG. 1 and FIG. 2 may also be realized by arranging in the casing 8 a single pellet having double-length.

The single-length pellet 3 has a length 30 in a range between 3 mm and 10 mm. The pellet 3 has a diameter 32 in a range between 3 mm and 7 mm.

The casing 8 has a length 86 in a range between 7 mm and 18 mm. The inner diameter of the casing 8 corresponds to the diameter 32 of the pellet.

The outer diameter 85 of the casing 8 is in a range between 4 mm and 8 mm.

The pellet 3 is arranged symmetrically in the casing 8, leaving empty edge portion 82 on both sides of the pellet 3. The edge portions 82 may each have a length in a range between 0.5 mm and 11 mm, preferably, in a range between 2 mm and 5 mm.

The pellet as shown in FIG. 1 and FIG. 2 may be formed directly inside the casing 8 or may be pre-formed and inserted into the casing 8.

The two end portions of the tubular casing 8 are each sealed by a sealing cap 80, for example a pierceable or removable foil.

Figure 3:
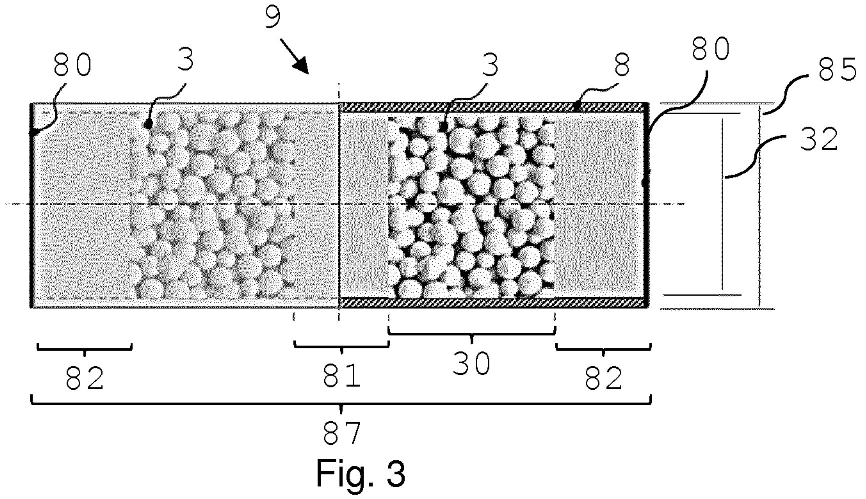
FIGS. 3,4 are schematic illustrations of a tubular-shaped consumable comprising two distinct pellets in a partial longitudinal and transversal cross sectional view.
Figure 4:
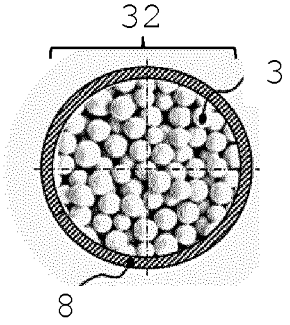

FIG. 3 and FIG. 4 show a same tubular shaped casing 8 as in FIGS. 1 and 2, wherein the same reference numerals are used for the same or similar elements.

Two pre-formed pellets 3 made of a plurality of particles are arranged in the casing 8. The two pellets 3 are arranged at a distance 81 to each other. The pellets have a same size as the single-length pellet of FIG. 1 and FIG. 2.

The distance 81 between the pellets 3 preferably lies in a range between 1 mm and 9 mm, more preferably in a range between 1 mm and 4 mm. The casing may have a length 87, which may be longer than the length 86 of a casing 8 with only one pellet. A length 87 of a casing comprising two or more pellets 3 is in a range between 8 mm and 35 mm, preferably in a range between 8 mm and 18 mm.

The two pellets 3 are arranged symmetrically in the casing 8, also leaving empty edge portions 82 on the sides of the pellets 3 directing versus the two ends of the tubular casing 8.

The two end portions of the tubular casing 8 are each sealed by sealing caps 80, for example a pierceable or removable foil.

An aerosol-generating article comprising two or more individual pellets are specifically manufactured for segmented or sequential heating in aerosol-generating devices designed for sequential or segmented induction heating.

Figure 5:
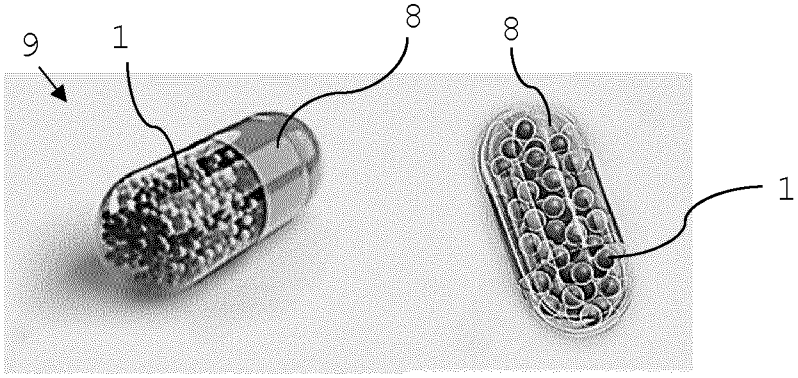
FIG. 5 shows capsules comprising a plurality of particles.

In FIG. 5 a casing 8 in the form of a capsule is filled with a predefined amount or number of inductively heatable particles 1, for example aerosol-forming substrate coated susceptor flakes or granules or a combination thereof. After filling of the capsule, hermetic closing of the capsule may be achieved by techniques known in the art, for example from pharmaceutical industry. The particles 3 may precisely be dosed and filled into the capsule before closing the two halves of the capsule. The casing is made of a pierceable material such that upon piercing of the casing an air path into and through the capsule may be provided upon use of the capsule.

Figure 6:
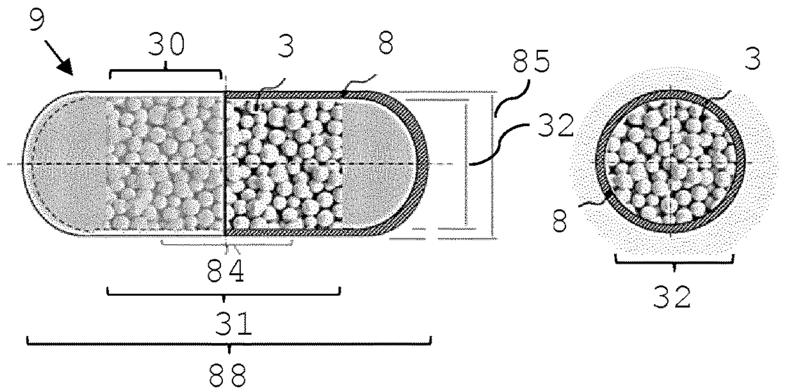
FIG. 6 is a schematic illustration of a capsule comprising a pellet in a partial longitudinal and transversal cross sectional view.

A capsule may also be filled with a preformed pellet 3 as shown in FIG. 6. Sizes of the capsule as well as of the pellet 3 are the same as given for the tubular casing and pellet of FIG. 1 and FIG. 2. In the capsule, an overlap portion 84 is formed after closing the two halves of the capsule.

The capsule may be a standard two-part capsule as used in pharmaceutical industry. Typical volumes of such capsules are about 0.20 ml to 1.04 ml with a typical fill capacity of about 170 mg to about 1250 mg.

Figure 7:
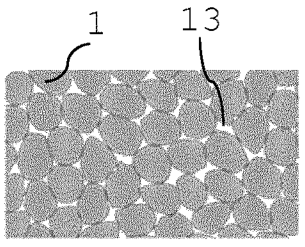
FIG. 7 illustrates porosity of a pellet.

FIG. 7 is a schematic representation of a cross-section of a pellet formed of granules 1. The granules 1 are compacted to a confined space showing interstices 13 between individual granules, which define a porosity of the pellet through the tri-dimensional gaps between the granules 1. Such a porosity preferably lies in a range between 0.24 and 0.35, wherein the porosity is the volume fraction of void space within the pellet.

The granules or particles 1 from which the pellets 3 are formed comprise a susceptor core, which is coated by one or several aerosol-forming substrate coatings.

Figure 8A:
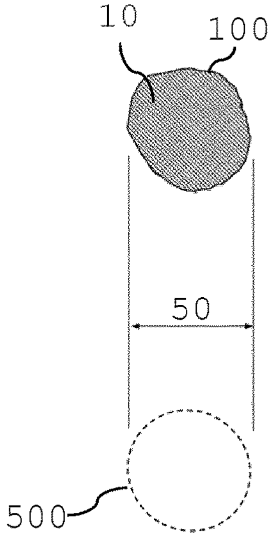
FIG. 8*a-c* show cross sections of a susceptor granule before and after two coating steps with aerosol-forming substrate.
Figure 8B:
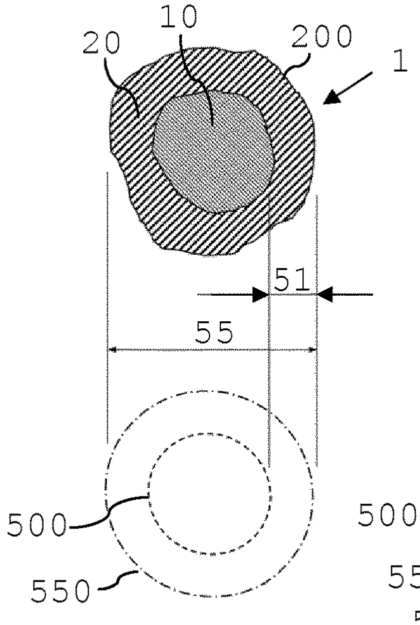
Figure 8C:
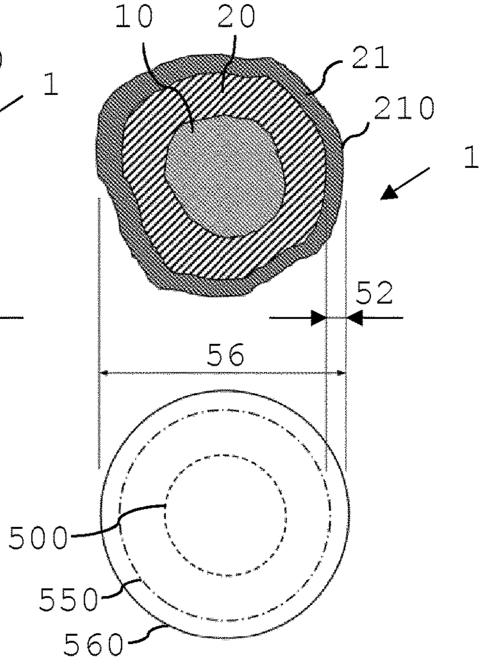

FIG. 8*a* shows a cross section of a susceptor core particle in the form of a granule 10 with rough surface 100. In FIG. 8*b* the susceptor core particle 10 is coated with a first coating of aerosol-forming substrate 20. This first coating 20 also has a rough surface 200. In FIG. 8*c* a second coating 21 of aerosol-forming substrate coats the first coating 20. Also this second coating 21 is provided with a rough surface 210. The aerosol-forming substrate of the first coating and of the second coating may be the same or different, for example different in any one or a combination of composition, density, porosity, coating thickness.

The particles 1 shown in FIGS. 8*b* and 8*c* in the form of granules formed by the susceptor core 10 coated with one or two aerosol-forming substrate coatings 20,21 form particles 1, which may be filled into a capsule or may be compacted to form pellets.

Preferably, the susceptor granule 10 is a metallic granule made of a metal or metal alloy, for example an austenitic or martensitic stainless steel. Preferably, the first and second aerosol-forming substrate coatings 20,21 are tobacco containing substrate coatings. In the embodiment shown in FIGS. 8*b* and 8*c*, the second coating 21 has about half of the thickness of the first coating 20.

Sizes of particles, as well as of coatings may be determined by average circumferences 500,550,560 as shown in the lower part of FIGS. 8*a-c*. Susceptor granules, as well as the final granules 1 often do not have an exact round shape such that an average diameter 50,55,56 or an average coating thickness 51,52 is determined for the susceptor granules 10 and the final granules 1.

An average diameter 50 for a susceptor granule 10 may be in a range between 0.1 millimeter and 4 millimeter, preferably between 0.3 millimeter and 2.5 millimeter.

An average thickness 51 for a first aerosol-forming substrate coating 20 may be in a range between 0.05 millimeter and 4.8 millimeter, preferably between 0.1 millimeter and 2.5 millimeter.

Thus, an average diameter 55 of a granule comprising one coating 20 of aerosol-forming substrate may be between 0.2 millimeter and a maximum of 6 millimeter, preferably between 0.5 millimeter and 4 millimeter.

An average thickness 52 for a second aerosol-forming substrate coating 21 may be in a range between 0.05 millimeter and 4 millimeter, preferably between 0.1 millimeter and 1.3 millimeter.

Thus, an average diameter 56 of a granule comprising two coatings 20,21 of aerosol-forming substrate may be between 0.3 millimeter and a maximum of 6 millimeter, preferably between 0.7 millimeter and 4 millimeter.

While a maximum particle size is 6 millimeter, preferably 4 millimeter, even more preferably 2 millimeter, an average diameter 55 of the particle shown in FIG. 8*b* having one coating is typically smaller than an average diameter 56 of the particle shown in FIG. 8*c* having two coatings.

When using a tobacco and aerosol-former containing slurry as aerosol-forming substrate coating, preferably a fluid bed granulation method is used for high volume production of particles 1. If low moisture slurry is used, preferably, powder granulation methods may be used for particle production. Preferably rotative coating granulators are used for the manufacture of granules.

Figure 9A:
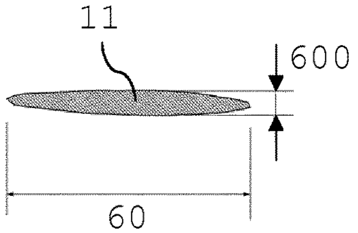
FIG. 9*a-c* show cross sections of a susceptor flake before and after two coating steps with aerosol-forming substrate.
Figure 9B:
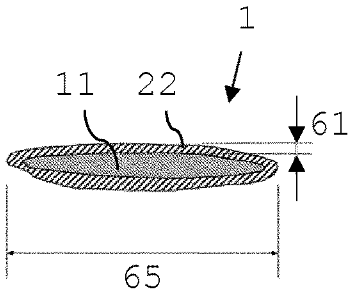
Figure 9C:
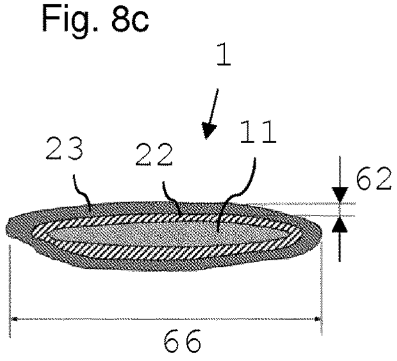

FIG. 9*a* shows a cross section of a susceptor core particle in the form of a flake 11. In FIG. 9*b* the susceptor flake 11 is coated with a first coating of aerosol-forming substrate 22. In FIG. 9*c* a second coating 23 of aerosol-forming substrate coats the first coating 22. A plurality of the inductively heatable flake 1 as shown in FIG. 9*b* or FIG. 9*c* may be used for being filled into a capsule or for being compacted into a pellet.

A diameter 60 of a susceptor flake may be between 0.2 millimeter and 4.5 millimeter, preferably between 0.5 millimeter and 2 millimeter. A thickness 600 of the susceptor flake may be between 0.02 millimeter and 1.8 millimeter, preferably between 0.05 millimeter and 0.3 millimeter.

A thickness 61,62 for a first and a second aerosol-forming substrate coating 22,23 may be in the same ranges and in the same preferred ranges as the thicknesses for the above described coatings for granules.

Thus, a diameter 65 of a flake 1 coated with one aerosol-forming coating as shown in FIG. 9*b* may be in a range between 0.3 millimeter and a maximum of 6 millimeter, preferably between 0.7 millimeter and 4 millimeter. A thickness of a flake 1 coated with one aerosol-forming coating 22 may be in a range between 0.12 millimeter and a maximum of 6 millimeter, preferably between 0.25 millimeter and 4 millimeter.

A diameter 66 of a flake 1 coated with two aerosol-forming coatings 22,23 as shown in FIG. 9*c* may be in a range between 0.4 millimeter and a maximum of 6 millimeter, preferably between 0.9 millimeter and 4 millimeter. A thickness of a flake 1 coated with two aerosol-forming coatings may be in a range between 0.22 millimeter and a maximum of 6 millimeter, preferably between 0.45 millimeter and 4 millimeter.

Figure 10A:
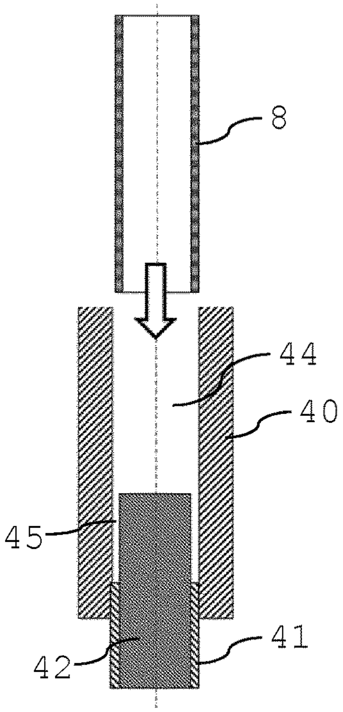
FIGS. 10*a-g* illustrate a manufacturing process for tubular consumables.
Figure 10B:
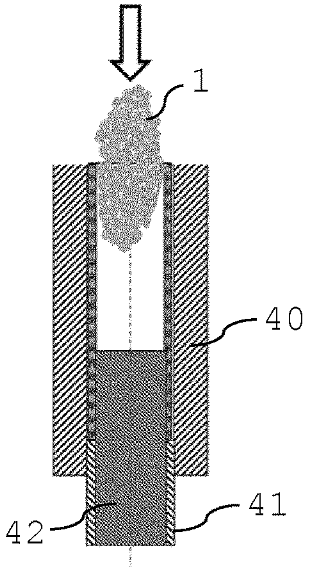
Figure 10C:
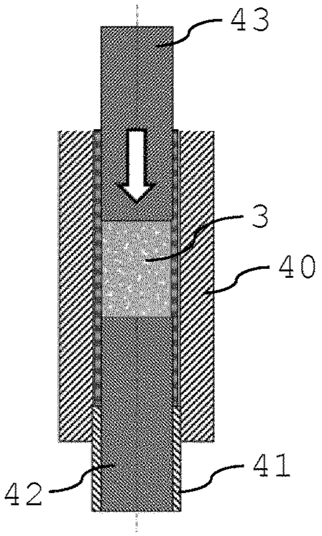
Figure 10D:
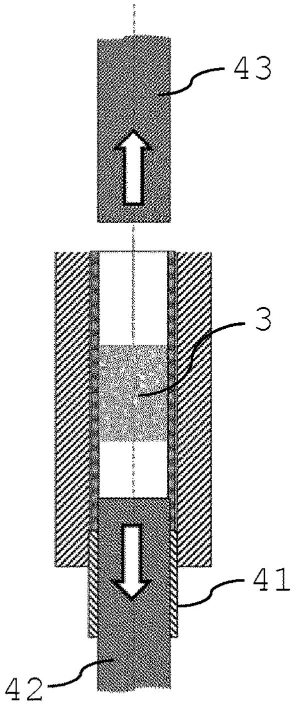
Figure 10E:
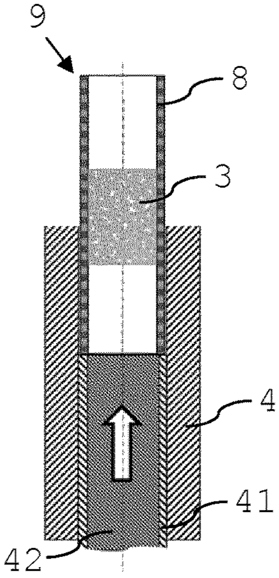
Figure 10F:
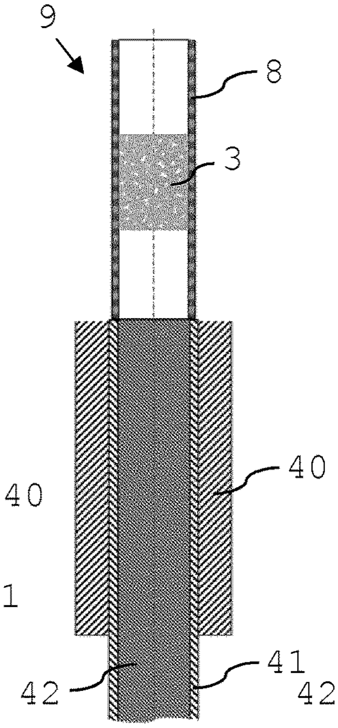
Figure 10G:
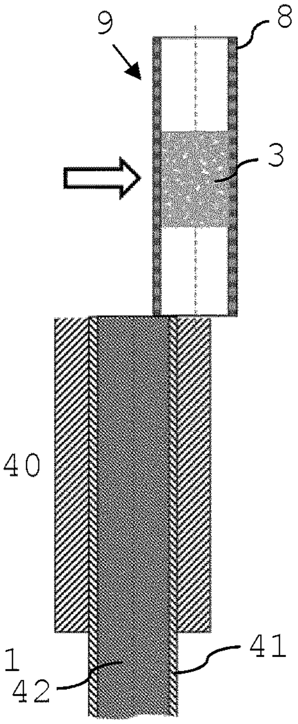

FIG. 10*a* to FIG. 10*g* illustrate a manufacturing process of an aerosol-generating article or consumable 9, wherein a pellet 3 is formed in its casing 8. A mold 40 having a cavity 44 within is closed at a lower end by an inner bottom piston 42 and an outer bottom piston 41. Inner piston 42 and outer piston 41 are movable relative to each other and within the cavity 44. In FIG. 10*a* the outer piston 41 is in its retracted position, while the inner piston 42 is in a pellet forming position. Between inner piston 2 and cavity wall a circumferentially running receiving space 45 is formed for receiving a casing 8. A tubular casing 8 is inserted from the open top side of the mold 40 into the cavity 44 and into the receiving space 45. The outer piston 41 thereby forms an end stop for the casing 8. After positioning the casing in the mold 40, a metered amount of inductively heatable particles 1 is filled into the casing 8 in the cavity 44 as shown in FIG. 10*b*. In FIG. 10*c*, a top piston 43 moves from the open top end of the mold 40 into the casing 8 until a desired compacting of the particles 1 and size of the pellet 3 is reached. Top piston 43 and inner bottom piston 42 are then retracted. While the top piston 43 is entirely removed from the casing 8 and the cavity 44, the inner bottom piston 42 is retracted to the retracted position of the outer bottom piston 41. Both bottom pistons 41,42 being at a same level are then moved upwards pushing the consumable 9 via the casing 8 upwards out of the cavity 44 as may be seen in FIG. 10*e* and FIG. 10*f*. In FIG. 10*f* the bottom pistons 41,42 have completed their upward movement and are at their most extended position. The consumable 9 is ejected from the cavity 44 and may be removed, for example, for being sealed with end caps. The consumable 9 may directly be inserted into a cavity of an aerosol-generating device.

Figure 11:
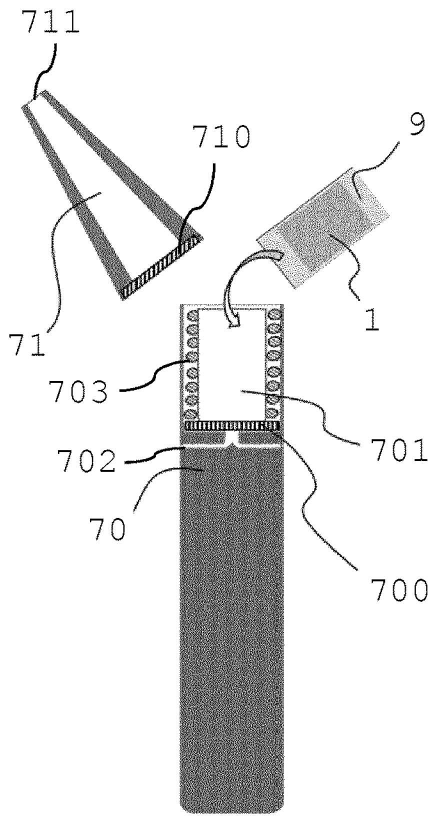
FIG. 11 schematically illustrates an inductively heatable aerosol-generating device during preparation for use of the device.
Figure 12:
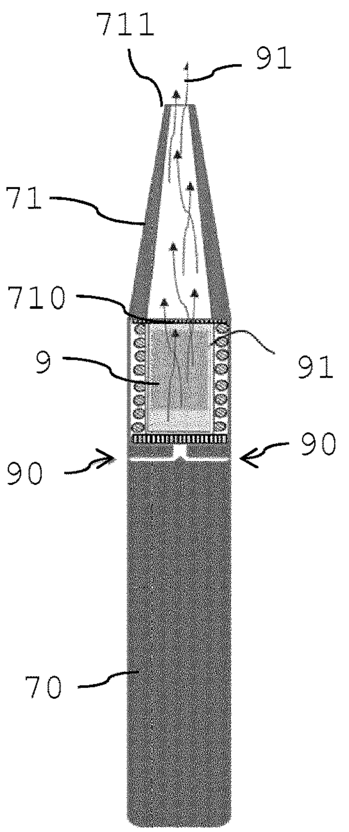
FIG. 12 illustrates the device of FIG. 11 in operation.

The inductively heatable aerosol-generating device shown in FIG. 11 and FIG. 12 comprises a main housing 70 and a mouthpiece 71. The main housing 70, preferably in tubular form, comprises a cavity 701 for receiving a consumable 9 comprising a pellet 3 made of a plurality of inductively heatable particles 1, for example a pellet manufactured according to the method shown in FIG. 10*a* to FIG. 10*g*. The main housing 70 also comprises an inductor, here in the form of an induction coil 703, for inductively heating the susceptor core of the particles 1 of the pellet 3 arranged in the cavity 701. The induction coil 703 is arranged to surround the cavity 701 in longitudinal direction and to be able to heat inductive material arranged in the cavity 701.

The main housing 70 also comprises a battery and a power management system (not shown).

The mouthpiece 71 forms the proximal or most downstream element of the device.

The bottom of the cavity 701 as well as the bottom or distal end of the mouthpiece 71 is closed by a porous element 700,710 for example a porous material or a grid or mesh. The porous elements 700,710 (in the mounted state of the mouthpiece as shown in FIG. 12) are adapted to position and retain the consumable 9 in the cavity 701 and to allow an airflow to pass through the porous elements 700,710, through the cavity 701 and into and through the mouthpiece 71.

The main housing 70 is provided with air-inlet channels 702 to allow air 90 from the environment to enter the housing 70 and pass into the cavity 701. Therein, the air 90 picks up aerosol formed in the cavity by heating the particles 1 of the pellet 3. The aerosol containing air 91 continuous further downstream leaving the device through an outlet opening 711 of the mouthpiece 71 at the proximal end of the mouthpiece, which airflow 90, 91 is illustrated in FIG. 12.

Upon preparing a device for use, the mouthpiece 71 may be removed from the main housing 70 such as to provide open access to the cavity 701. Removal may be a complete detachment of the mouthpiece 71 from the housing 70 as shown in the example of FIG. 11. Removal may also be an incomplete removal, for example a hinging away of the mouthpiece, where the mouthpiece 71 remains connected to the housing 70 via a hinge.

A pellet or consumable 9 may then be filled into the cavity 701. After repositioning of the mouthpiece 71 on the housing 70 the device is ready for being used.

Figure 13:
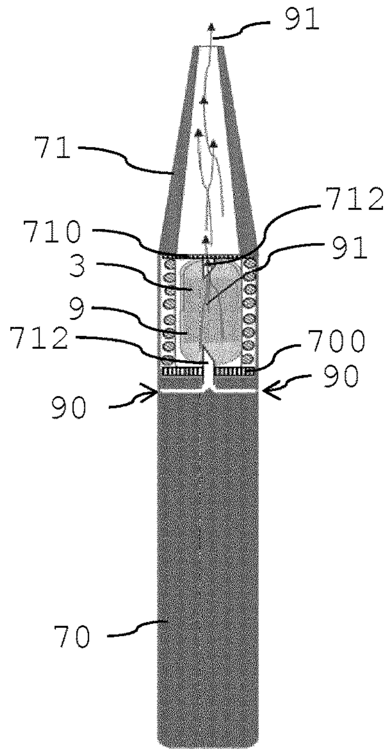
FIG. 13 illustrates an aerosol-generating device in operation with capsule and piecing member.

In FIG. 13, an inductively heatable inductively heatable aerosol-generating device is shown, where a consumable 9 in the form of a capsule comprising a pellet 3 is shown. The device is further provided with piercing members 712, preferably hollow piercing members, for piercing the pierceable casing of the capsule from two opposite sides. One of the two piercing members 712 is arranged at the distal end of the mouthpiece. The other piercing member 712 extends from the device housing into the cavity 703 through the porous element 700. Upon reattachment of the mouthpiece 71, the piercing members 712 are pushed into the capsule, creating a pathway for air to pass through the capsule.

In FIG. 13 the same reference numerals are used for the same or similar elements as in the device shown in FIG. 11 and FIG. 12.

The invention claimed is:

1. An inductively heatable aerosol-generating article comprising:
- a casing and a plurality of inductively heatable aerosol-generating particles arranged in the casing,
- wherein the inductively heatable aerosol-generating particles of the plurality of inductively heatable aerosol-generating particles comprise a core of susceptor material comprising ferromagnetic material, which core of susceptor material is coated with aerosol-forming substrate,
- wherein the plurality of inductively heatable aerosol-generating particles forms more than one pre-formed aerosol-generating pellet, wherein the casing comprises a longitudinal shape having a longitudinal axis, wherein the more than one aerosol-generating pellets are arranged at a distance to each other along the longitudinal axis of the casing, and wherein the distance is formed by a gap in a range between 1 mm and 9 mm, and
- wherein the more than one aerosol-generating pellets are spaced apart from ends of the casing such that none of the plurality of inductively heatable aerosol-generating particles that form the more than one aerosol-generating pellets are in contact with the ends of the casing to form an empty space that extends continuously from each end of the casing to the plurality of inductively heatable aerosol-generating particles that form a closest pellet of the more than one pellet.

2. The inductively heatable aerosol-generating article according to claim 1, wherein the casing comprises two opposed ends, and wherein one or both of the opposed ends of the casing is pierceable.

3. The inductively heatable aerosol-generating article according to claim 2, wherein the casing is cylindrical and one or both of the opposed ends is sealed by one or more pierceable or removable barriers.

4. The inductively heatable aerosol-generating article according to claim 2, wherein the one or both of the opposed ends is sealed by one or more pierceable or removable foil.

5. The inductively heatable aerosol-generating article according to claim 1, wherein the casing comprises a polymer material or a cellulose based material.

6. The inductively heatable aerosol-generating article according to claim 1, wherein at least one of the pellets has a porosity in a range between 0.2 and 0.35.

7. The inductively heatable aerosol-generating article according to claim 1, wherein at least one of the pellets has a tubular form having a length between 2 millimeter and 20 millimeter and a diameter between 2 millimeter and 15 millimeter.

8. The inductively heatable aerosol-generating article according to claim 1, wherein at least one of the pellets comprises different types of inductively heatable aerosol-generating particles, wherein different types of inductively heatable aerosol-generating particles differ in at least one of size or shape of the particles, shape or composition of susceptor material, thickness, porosity or composition of aerosol-forming substrate coating, aerosol delivery profile.

9. The inductively heatable aerosol-generating article according to claim 1, wherein the core of susceptor material of the particles of the plurality of inductively heatable aerosol-generating particles is a susceptor granule, susceptor flake or susceptor fibers.

10. The inductively heatable aerosol-generating article according to claim 1, wherein the core of susceptor material comprises multiple aerosol-forming substrate coatings.

11. The inductively heatable aerosol-generating article according to claim 1, wherein a volumetric ratio of an amount of susceptor material to an amount of aerosol-forming substrate is 1:1 to 1:4.

12. The inductively heatable aerosol-generated article according to claim 1, wherein at least one of the pellets is hermetically sealed in the casing.

13. The aerosol-generating article according to claim 1, wherein the plurality of inductively heatable aerosol-generating particles are pelletized to form the more than one aerosol-generating pellets.

14. The inductively heatable aerosol-generating article according to claim 1, wherein the distance between adjacent pellets of the more than one aerosol-generating pellet is between 1 mm and 9 mm.

15. The inductively heatable aerosol-generating article according to claim 1, wherein the more than one aerosol-generating pellet are each arranged symmetrically in the casing.

16. The inductively heatable aerosol-generating article according to claim 1, wherein the more than one of the aerosol-generating pellets have a porosity in a range between 0.2 and 0.35.

17. The inductively heatable aerosol-generating article according to claim 1, wherein the more than one of the aerosol-forming pellets have a tubular form having a length between 2 millimeter and 20 millimeter and a diameter between 2 millimeter and 15 millimeter.

18. The inductively heatable aerosol-generating article according to claim 1, wherein the more than one of the aerosol-forming pellets comprise different types of aerosol-generating particles, wherein different types of aerosol-generating particles differ in at least one of size or shape of the particles, shape or composition of susceptor material, thickness, porosity or composition of aerosol-forming substrate coating, aerosol delivery profile.

19. The inductively heatable aerosol-generating article according to claim 1, wherein the casing comprises paper or cardboard.

20. The inductively heatable aerosol-generating article according to claim 1, wherein outer dimensions of the casing correspond to outer dimensions of the aerosol-generating article.

21. An inductively heatable aerosol-generating article comprising:

a casing and a plurality of inductively heatable aerosol-generating particles arranged in the casing, wherein the inductively heatable aerosol-generating particles of the plurality of inductively heatable aerosol-generating particles comprise a core of susceptor material, which core of susceptor material is coated with aerosol-forming substrate, wherein the plurality of inductively heatable aerosol-generating particles forms more than one aerosol-generating pellet, wherein the casing comprises a longitudinal shape having a longitudinal axis, and wherein pellets of the more than one aerosol-generating pellet are arranged at a distance to each other along the longitudinal axis of the casing, the distance formed by a gap in a range between 1 mm and 9 mm, and wherein the pellets are spaced apart from ends of the casing such that none of the plurality of inductively heatable aerosol-generating particles that form the more than one aerosol-generating pellet are in contact with the ends of the casing to form an empty space that extends continuously from each end of the casing to the plurality of inductively heatable aerosol-generating particles that form a closest pellet of the pellets.

22. The inductively heatable aerosol-generating article according to claim 1, wherein the more than one aerosol-generating pellet are each obtained by pelletizing a portion of the plurality of aerosol-generating particles providing a mechanically stable product.

* * * * *